United States Patent [19]

Parker et al.

[11] Patent Number: 5,156,656
[45] Date of Patent: Oct. 20, 1992

[54] SEMI-PERMEABLE MEMBRANES DERIVED FROM REACTIVE OLIGOMERS

[75] Inventors: Theodore L. Parker, Walnut Creek; Edgar S. Sanders, Jr., Pittsburg, both of Calif.

[73] Assignee: The Dow Chemical Company, Midland, Mich.

[21] Appl. No.: 759,295

[22] Filed: Sep. 13, 1991

[51] Int. Cl.$^5$ ............ B01D 53/22; B01D 71/52
[52] U.S. Cl. ............ 55/16; 55/68; 55/70; 55/73; 55/158
[58] Field of Search ............ 55/16, 68, 158, 267, 55/269, 66, 70, 71, 73

[56] References Cited

U.S. PATENT DOCUMENTS

| | | | |
|---|---|---|---|
| Re. 30,351 | 7/1980 | Hoehn et al. | 55/16 |
| 4,714,481 | 12/1987 | Matsuura et al. | 55/158 |
| 4,772,392 | 9/1988 | Sanders, Jr. et al. | 210/500.23 |
| 4,818,254 | 4/1989 | Anand et al. | 55/16 |
| 4,838,904 | 6/1989 | Sanders, Jr. et al. | 55/158 |
| 4,840,646 | 6/1989 | Anand et al. | 55/16 |
| 4,851,014 | 7/1989 | Jeanes | 55/16 |
| 4,874,401 | 10/1989 | Jeanes | 55/16 |
| 4,929,357 | 5/1990 | Schucker | 55/158 X |
| 4,955,993 | 9/1990 | Sanders, Jr. et al. | 55/16 |
| 4,959,082 | 9/1990 | Admassu et al. | 55/16 |
| 4,962,131 | 10/1990 | Beck et al. | 521/51 |
| 4,964,890 | 10/1990 | Reuter et al. | 55/158 |
| 4,971,695 | 11/1990 | Kawakami et al. | 210/500.23 |
| 4,975,228 | 12/1990 | Sanders, Jr. et al. | 264/41 |
| 4,994,095 | 2/1991 | Kawakami et al. | 55/16 |
| 5,007,945 | 4/1991 | Tien et al. | 55/16 |
| 5,009,679 | 4/1991 | Angus et al. | 55/16 |
| 5,013,332 | 5/1991 | Surnamer et al. | 55/16 |
| 5,030,252 | 7/1991 | Sanders, Jr. et al. | 55/16 |
| 5,034,034 | 7/1991 | Sanders, Jr. et al. | 55/158 |
| 5,080,698 | 1/1992 | Krizan | 55/158 |
| 5,102,552 | 4/1992 | Callahan et al. | 210/654 |

FOREIGN PATENT DOCUMENTS

| | | | |
|---|---|---|---|
| 53-066880 | 6/1978 | Japan . | |
| 58-8511 | 1/1983 | Japan . | |
| 1-080420 | 3/1989 | Japan | 55/158 |
| 1-080424 | 3/1989 | Japan | 55/158 |

OTHER PUBLICATIONS

Parisi Skischally, Silvia, "Gas Permeability in Amorphous Linear And Crosslinked Poly(arylene ether ketones)," Masters Thesis, Virginia Polytechnic Institute and State University, Apr. 25, 1991.

Barbari et al, "Polymeric Membranes Based on Bisphenol-A For Gas Separations," *Journal of Membrane Science*, vol. 42, 1989.

Muruganandam, University of Texas at Austin, Separations Research Program, paper presented at fall meeting on Oct. 28 and 29, 1985, "Sorption and Transport in Substituted Polycarbonates and Polystyrene/Tetramethyl Polycarbonate Blends".

Chern et al., Chapter 2, "Material Selection for Membrane-Based Gas Separations," *Material Science of Synthetic Membranes*, Lloyd Ed. American Chemical Society 1985, pp. 25–46.

Primary Examiner—Robert Spitzer
Attorney, Agent, or Firm—Janet Pauline Clark

[57] ABSTRACT

The invention relates to semi-permeable gas separation membranes derived from oligomers containing reactive end groups.

34 Claims, No Drawings

SEMI-PERMEABLE MEMBRANES DERIVED FROM REACTIVE OLIGOMERS

BACKGROUND OF THE INVENTION

This invention relates to semi-permeable gas separation membranes derived from oligomers containing reactive end groups and a process for separating gases using said membrane.

The use of membrances to separate gases is known in the art. Membranes have been used to recover or isolate a variety of gases, including hydrogen, helium, oxygen, nitrogen, carbon monoxide, carbon dioxide, water vapor, hydrogen sulfide, ammonia, and/or light hydrocarbons. Applications of particular interest include the separation of hydrogen or helium from gas mixtures such as mixtures containing nitrogen, carbon monoxide, carbon dioxide, water vapor, and/or light hydrocarbons. For example, the separation and recovery of hydrogen for recycle is often necessary in various hydrocracker, hydrotreater, and catalytic cracking processes used in the oil refinery industry. Other applications of interest include the separation of carbon dioxide from light hydrocarbons or other crude oil components as part of the tertiary oil recovery process. Additional applications include the recovery of an enriched oxygen stream from air for use in enhanced combustion or fermentation processes. Alternatively, an enriched nitrogen stream may be obtained from air for use as an inert atmosphere over flammable fluids or for food storage. Membranes can be used to achieve such separations.

Such membrane separation are based on the relative permeability of two or more gaseous components through the membrane. To separate a gas mixture into two portions, one richer and one leaner in at least one gaseous component, the mixture is brought into contact with one side of a semi-permeable membrane through which at least one of the gaseous components selectively permeates. A gaseous component which selectively permeates through the membrane passes through the membrane more rapidly than at least one other gaseous component of the mixture. The gas mixture is thereby separated into a stream which is enriched in the selectively permeating gaseous component or components and a stream which is depleted in the selectively permeating gaseous component or components. A relatively non-permeating gaseous component passes more slowly through the membrane than at least one other gaseous component of the mixture. An appropriate membrane material is chosen so that some degree of separation of the gas mixture can be achieved.

Membranes for gas separation have been fabricated from a wide variety of polymers, including certain cellulose esters and ethers, aromatic polyimides, polyaramides, plyarylates, polysulfones, polyethersulfones, polyesters, and polycarbonates. An ideal gas separation membrane is characterized by the ability to operate under high temperatures and/or pressures with minimal compaction and creep, while processing a high gas separation factor, that is, gas selectivity, and high gas permeability. Solvent resistance is also preferred; however, gas separation membranes also are preferably fabricated from polymers which are easily processed.

The problem is finding membrane materials which possess all the desired characteristics. Polymers possessing high separation factors generally have low gas permeabilities, while those polymers possessing high gas permeabilities generally have low gas separation factors. In the case, a choice between a high gas separation factor and a high gas permeability has been unavoidably necessary. Furthermore, some of the polymers previously used for membranes suffer from the disadvantage of poor performance under high operating temperatures and pressures due to compaction and creep experienced under such operating conditions over time. However, those polymers capable of operating at high temperatures and pressures for prolonged periods are typically very difficult to fabricate into membranes due to low solubility in common solvents and high melt and solution viscosities. Some polymers, particularly those containing substituent groups favorable for gas separation such as certain halo-substituents, may be very difficult to synthesize with sufficiently high molecular weight to be useful materials for membranes. Such polymers also tend to be expensive.

A membrane capable of separating gas mixtures which possesses good gas selectivity and gas permeability, ability to operate under extreme conditions of temperature and pressure with minimal compaction and creep, improved solvent resistance, and ease of fabrication is needed.

SUMMARY OF THE INVENTION

The invention is a semi-permeable gas separation membrane comprising a thin, cross-linked discriminating layer derived from an aligomer containing reactive end groups, wherein said oligomer possesses a degree of polymerization of less than about 15 or a number-average molecular weight of less than about 6,000.

In another aspect, the invention is a process of separating gases comprising:

A. contacting one side of a semi-permeable gas separation membrane with a feed gas mixture under pressure, wherein said membrane divides a separation chamber into a high pressure side into which the feed gas mixture is fed and a low pressure side;

B. maintaining a pressure differential across the membrane under conditions such that at least one gaseous component in the feed gas mixture selectively permeates through said membrane from the high pressure side to the low pressure side of the membrane;

C. removing from the low pressure side of said membrane permeated gas which is enriched in at least one selectively permeating gaseous component; and D. removing from the high pressure side of said membrane non-permeated gas which is depleted in at least one selectively permeating gaseous component;

wherein said membranes comprises a thin, cross-linked discriminating layer derived from an oligomer containing reactive end groups, wherein said oligomer possesses a degree of polymerization of less than about 15 or a number-average molecular weight of less than about 6,000.

DETAILED DESCRIPTION OF THE INVENTION

The present invention relates to semi-permeable gas separation membranes comprising a thin, cross-linked discriminating layer derived from an oligomer containing reactive end groups, wherein said oligomer possesses a degree of polymerization of less than about 15 or a number-averaged molecular weight of less than about 6,000.

As used herein, "oligomer" refers to a polymer molecule which possesses a low degree of polymerization, that is, a low number of repeat units. The oligomers useful in the present invention preferably have a number-average molecular weight of less than about 6,000, more preferably of less than about 5,000, even more preferably of less than about 4,000. Depending upon the unit molecular weight, the oligomers useful in the present invention preferably have a degree of polymerization of less than about 15, more preferably of less than about 10, even more preferably of less than about 8, most preferably of less than about 6.

The oligomers useful in the present invention comprise an oligomeric component capped with reactive end groups. As used herein, "oligo-" refers to a short molecular chain of repeating units, that is, the non-terminal portion of the oligomer molecule. As used herein, "reactive end group" refers to the moiety capping the oligomeric component, that is, the terminal portion of the oligomer molecule. The reactive end groups of the oligomers may be thermally or photochemically activated to react with each other or to an added cross-linking agent. The reactive end groups may also be activated to react using an electron beam or gamma radiation. Preferably, reactions between the reactive end groups and other moieties contained in the repeating units of the oligomers are minimized.

The oligomers may be unsubstituted or substituted with moieties which are substantially unreactive towards the reactive end groups. In a preferred embodiment, the oligomeric component is selected from the group consisting of unsubstituted or substituted oligo-carbonates, oligo-estercarbones, oligo-esters, oligo-arylates, oligo-arylethers, oligo-amides, oligo-imides, oligo-amideimides, oligo-arylsulfones, oligo-etherketones including oligo-etheretherketones and oligo-etherketoneketones, oligoetherfulfones, oligo-etherimides, oligo-thioethers, oligo-pyridinylarylethers, oligo-benzoxazoles, oligo-oxadiazoles, oligo-anilines, oligo-pyrrole, oligotriazole, oligo-cyanoaryl ethers, and co-oligomers and physical mixtures thereof. In a more preferred embodiment, the oligomeric component is selected from the group consisting of unsubstituted or substituted oligo-carbonates, oligo-estercarbones, oligo-esters, oligo-arylates, oligo-arylethers, oligo-amides, oligo-imides, oligo-amideimides, oligo-arylsulfones, oligo-ethersulfones, oligo-etherimides, oligo-thioethers, oligo-pyridinylarylethers, oligo-benzoxazoles, oligo-oxadiazoles, oligo-anilines, oligo-pyrrole, oligo-triazole, oligo-cyanoaryl ethers, and co-oligomers and physical mixtures thereof. In an even more preferred embodiment, the oligomeric component is selected from the group consisting of oligo-carbonates, oligo-estercarbonates, oligo-imides, oligo-arylsulfones, oligo-estersulfones, oligo-etherimides, and co-oligomers and physical mixture thereof. In an even more preferred embodiment, the oligomeric component is selected from the group consisting of oligo-carbonates, oligo-arylethers, oligo-imides, and co-oligomers and physical mixtures thereof.

Preferred substituents for the oligomeric component include alkyl-substituents such as methyl, ethyl, the propyl, halo-substituents such as chloro, bromo, and fluoro, haloalkyl-substituents such as chloromethyl, dibromomethyl, trifluoromethyl, and cyano, nitro, and aryl. More preferred substituents are for the oligomeric component include methyl, bromo, chloro, fluoro, and rifluoromethyl. Even more preferred substituents for the oligomeric component include fluoro and trifluoromethyl.

A preferred class of oligomeric components comprise ring- and/or bridge-substituted bisphenol-based oligocarbonates, oligo-estercarbonates, and oligo-esters, wherein the substituents preferably are halosubstituents and more preferably are chloro-, bromo-, and/or fluoro-substituents.

The oligomers are capped with reactive end groups such that the reactive end groups chemically and covalently bond to other reactive end groups or to an added cross-linking agent. In a preferred embodiment, the reactive end groups are selected from the group consisting of hydroxy, methacrylate, acrylate, styryl, vinyl benzyl, cinnamate, vinyl, allyl, isopropenyl, benzocyclobutene, benzocyclobutanone, benzocyclobutene dione, epoxy, cyanate, maleimide, amine, ethynyl, trifluorovinyl, amino, methylol, and benzophenone. In a more preferred embodiment, the reactive end groups are selected from the group consisting of benzycyclobutene, methylol, benzophenone, methacrylate, amine, and styryl. Even more preferred reactive end groups are selected benzocyclobutene, and methacrylate.

The oligomer is dissolved in a solvent to from a solution. The concentration of oligomer in the solvent should be sufficient for the formation of a substantially uniform and continuous discriminating layer, that is, a layer substantially free from defects adversely affecting membrane performance. The concentration of oligomer in the solvent is preferably between about 1 and about 90 weight percent, more preferably between about 5 and about 75 weight percent, even more preferably between about 10 and about 60 weight percent. Preferred solvents include organics such as toluene, N-methyl-2-pyrrolidinone, dimethylacetamide, dimethylsulfoxide, sulfolane, and N-cyclohexylpyrrolidinone.

The membranes formed may be homogeneous or composite. Preferably the membranes formed are composite. The oligomer solution is cast, coated, sprayed, rolled, dipped, contacted, or otherwise applied to an intermediate or temporary surface from which the discriminating layer is subsequently removed or the surface dissolved or the oligomer solution may be applied directly to a composite membrane support layer to form a substantially uniform coating layer depostied on the surface or support layer. In the case of films, a continuous casting process may be achieved by casting the solution onto endless belts or rotating drums. In the case of hollow fibers, a continuous process may be achieved by passing the hollow fibers through a bath comprising the oligomer solution or passing the oligomer solution through the bores of the hollow fibers. In the case of composite membranes, the support layer is preferably porous. Penetration of the oligomer solution from which the discriminating layer is formed into the pores of the porous support layer is acceptable so long as the desired thickness of the membrane is not exceeded. The porous support layer is characterized in that it preferably does not significantly impeded the transport of gas through the membrane. The porous support layer may optionally be first coated with an intermediate layer having a low resistance to gas transport or otherwise treated to prevent penetration of the oligomer solution into the pores of the support. Alternately, the oligomer solution may be first coated onto an intermediate or temporary surface from which the resulting discriminating layer is then removed or the surface dissolved and the discriminating layer then adhered to the support layer such as by lamination to form a composite membrane.

The support layer for composite membranes preferably comprises a microporous polymers membrane characterized by a porosity of between about 10 percent and about 90 percent, more preferably of between about 20 and about 80 percent and an average pore size of up to about 1 micron, more preferably of about up to 0.5 microns, even more preferably of about up to 0.2 microns, most preferably of about up to 0.1 microns. Wherein the walls of such microporous membranes are thin or highly deformable, an additional layer such as another membrane or a highly porous screen or mesh may also be used to provide adequate support for the membrane. The microporous membrane may be film or hollow fiber form.

The microporous membrane used for the composite support layer preferably comprises a polymer selected from the group consisting of unsubstituted or substituted polysulfones or polyethersulfones, polyetherketones including polyetheretherketones and polyetherketoneketones, polyethers, polyesters, polycarbonates, polyestercarbonates, polyarylates, polyamides, polyimides, polybenzoxazoles, cellulosics, cellulose esters, and polyfluoroolefins. More preferably, the microporous membrane comprises a polymer selected from the group consisting of polyether ketones, polybenzoxazoles, polysulfones, and polyethersulfones. Such miroporous membranes may be prepared by techniques known to one skilled in the art of microporous membrane fabrication. See, for example, for microporous polyetherketone membranes, U.S. Pat. No. 4,904,426; and for microporous polybenzoxzaoles membranes, U.S. patent application Ser. No. 513,345, filed Apr. 20, 1990; the relevant portions relating to microporous membrane fabrication incorporated herein by reference for all legal purposes served thereby. Microporous ceramic membranes may also be used as the support layer.

After forming the coating of the oligomer solution, the coating is then exposed to conditions to substantially remove solvent therefrom. Removal of solvent may occur by evaporation over time, exposing the coating to a vacuum, exposing the coating to an elevated temperature, exchanging with a solvent more readily removed, or a combination thereof.

The discriminating layer of the membrane is simultaneously or subsequently cross-linked the coating formed by thermally or photochemically curing the coating. The coating may also be cured by using an electron beam or gamma radiation. During cross-linking, the end groups of the oligomer react to form a network, resulting in a cross-linked discriminating layer. The network possesses a cross-link density which may be controlled by the length of the oligomer, that is, the number of repeating units in the oligomer.

Preferably, the discriminating layer possesses a thickness of between about 0.02 and about 25 microns, more preferably between about 0.02 and about 10 microns, even more preferably between about 0.02 microns and 1 micron. Preferably, the support layer in composite membranes possesses a thickness of between about 10 and about 150 microns, more preferably between about 20 and about 100 microns. Hollow fiber composite membranes preferably possess an outer diameter in the range of from about 50 to about 350 microns, more preferably in the range of from about 150 to about 275 microns. The discriminating layer may be on the outside of the inside of a hollow fiber membrane.

The membranes are fabricated into flat sheet, spiral wound, tubular, or hollow fiber devices by methods known in the art. See U.S. Pat. Nos. 3,228,876; 3,422,008; 3,455,460; 3,475,331; 3,755,034; 4,061,574; 4,080,296; 4,336,138; 4,707,267; 4,752,305; 4,871,379; 4,929,259; 4,961,760; and 5,013,437; the relevant portions of each patent relating to device fabrication incorporated herein by reference for all legal purposes which may be served thereby.

The membranes are sealingly mounted in a pressure vessel in such a manner that the membrane separates the vessel into two fluid regions wherein fluid flow between the two regions is accomplished by fluid permeating through the membrane. The membrane divides the separation chamber into two regions, a high pressure side into which the feed gas mixture is introduced and a lower pressure side. One side of the membrane is contacted with a feed gas mixture under pressure, while a pressure differential is maintained across the membrane. In the embodiment wherein the membrane is in hollow fiber form, the feed gas mixture may be introduced on the outside or the inside of the hollow fiber. At least one gaseous component in the gas mixtures selectively permeates through the membrane more rapidly than the other gaseous component or components in the gas mixture. Gas which is enriched in the selectively permeating gaseous component or components is thus obtained on the low pressure side of the membrane which is removed from the low pressure side of the membrane as permeate. Gas depleted in the selectively permeating gaseous component or components is obtained on the high pressure side of the membrane which is removed from the high pressure side of the membrane as non-permeate.

Gas permeability is defined as $$P = \frac{(\text{amount of permeant})(\text{membrane thickness})}{(\text{area})(\text{time})(\text{driving force across the membrane})}.$$

A standard permeability measurement unit is the Barrer (Ba), which is equal to $$10^{-10} \frac{(\text{centimeter})^3 \, (\text{STP}) \, (\text{centimeter})}{(\text{centimeter})^2 \, (\text{second}) \, (\text{centimeter Hg})},$$

abbreviated hereinafter as $$10^{-10} \frac{\text{cm}^3 \, (\text{STP}) \, \text{cm}}{\text{cm}^2 \text{s cmHg}}.$$

The reduced gas flux is defined as (permeability)÷(membrane thickness). A standard reduced flux unit is $$10^{-6} \frac{(\text{centimeter})^3 \, (\text{STP})}{(\text{centimeter})^2 \, (\text{second}) \, (\text{centimeter Hg})},$$

abbreviated hereinafter as $$10^{-6} \frac{\text{cm}^3 \, (\text{STP})}{\text{cm}^2 \text{s cmHg}}.$$

Alpha, the gas separation factor or gas selectivity, is defined as the ratio of the permeability or flux of the faster permeating gas to the permeability or flux of the slow permeating gas.

The membranes of this invention are particularly useful for separating gas mixtures preferably comprising at least one gas selected from the group consisting of hydrogen, helium, oxygen, nitrogen, carbon monoxide, carbon dioxide, water vapor, hydrogen sulfide, ammonia, and light hydrocarbons. As used herein, the term light hydrocarbons refers to gaseous saturated and unsaturated $C_{1-4}$ hydrocarbons such as methane, ethane, ethylene, propane, propylene, butane, and butylene.

The membranes of this invention preferably possess a gas separation factor at about 30° C. for helium/methane of at least about 50, more preferably of at least about 95, even more preferably of at least about 150. The membranes of this invention preferably possess a gas separation factor at about 30° C. for helium/ethane of at least about 80, more preferably of at least about 150, even more preferably of at least about 300. The membranes of this invention preferably possess a gas separation factor at about 30° C. for helium/ethylene of at least about 75, more preferably of at least about 125, even more preferably of at least about 165. The membranes of this invention preferably possess a gas permeability for helium of at least about 5.0, Barrers, more preferably of at least about 15 Barrers, even more preferably of at least about 50 Barrers.

The membranes of this invention preferably possess a gas separation factor for oxygen/nitrogen at about 30° C. of at least about 3.0, more preferably of at least about 4.0, even more preferably of at least about 5.0. The membranes of this invention preferably possess a gas permeability for oxygen of at least about 0.5 Barres, more preferably of at least about 2.5 Barrers, even more preferably of at least about 4.0 Barrers.

The separation process is carried out at pressures and temperatures which do not deleteriously affect the membrane. Preferably, the pressure on the high pressure side of the membrane is between about 10 psig (68.95 kPa) and about 2000 psig (13,790 kPa), more preferably between about 50 psig (344.7 kPa) and about 1000 psig (6895 kPa). The temperature of the feed gas mixture is preferably between about 0° C. and about 150° C., more preferably between about 0° C. and about 120° C. The temperature of the membrane is preferably between about 0° C. and about 150°, more preferably between about 10° and about 120° C.

The membrane separation process of this invention may be combined with non-membrane separation processes such as cryogenics and pressure swing adsorption. The membranes may be operated in series or parallel. Operation may optionally include recycle or at least a portion of the permeate and/or non-permeate.

SPECIFIC EMBODIMENTS

The following Examples are included to illustrate the invention and are not intended to limit the scope of the invention or claims.

EXAMPLE 1

Benzocyclobutene (BCB) Capped Heptafluorotoluene (HFT) Based Oligomers

Preparation of Bis (Benzocyclobutenyloxy) pentafluorotoluene.

A 250 milliliter three necked round bottom flask equipped with a mechanical stirrer, thermocouple controller probe, gas inlet and outlet, and Dean-Stark apparatus was charged with N-methyl-2-pyrrolidinone (NMP) solvent, about 80 milliliters, and toluene, about 65 milliliters, and the flask was purged with a slow nitrogen stream and the mixture stirred. 4-Hydroxybenzocyclobutene, about 7.50 grams (about 62.43 mmole), and ground anhydrous potassium carbonate, about 8.97 grams (about 64.9 mmmol), were added to the mixture and heating begun. Water was azeotropically removed into the Dean-Stark apparatus at about 145° to 150° C. over about 25 minutes. The nitrogen flow was increased and toluene was distilled out at about 160° C. over about 15 minutes. The reaction mixture was then cooled in a water bath to about 50° C. The heating mantle was replaced, and a,a,a,2,3,5,6-heptafluorotoluene, about 6.81 grams (about 31.22 mmole) was added in one portion and heating resumed. The reaction mixture was held at about 120° C. for about 2 hours, then at about 140° C. for about 1 hour, and finally at about 150° C. for about 1 hour. After cooling to ambient temperature, the reaction mixture was neutralized with about 3.9 grams glacial acetic acid, diluted with about 100 milliliters methylene chloride, then transferred to a separatory funnel. The reaction mixture was extracted with about 500 milliliters of water divided into five portions, then the organic layer was dried over anhydrous magnesium sulfate, filtered through a fine glass frit, and the filtrate placed in a crystallizing dish on a hot plate with a surface temperature of about 125° C. for about 1 hour. The resultant yellow oil was allowed to cool and solidify to give a waxy product, about 12.75 grams, representing about 91 percent of theroretical yield. The waxy product was then triturated with 50/50 v/v methanol/water to give an amorphous powder. Melting point by Differential Scanning Calorimetry (DSC) was about 106° C. Analysis by fluorine-19 nmr indicated the product was composed of about 70 mmol percent disubstituted 2,6-isomer, about 26 mole percent disubstituted 2,5-isomer, and about 4 mole percent trisubstituted 2,3,6-isomer.

Preparation of Benzocyclobutene (BCB) Capped Heptafluorotoluene (HFT)/Bis AF Oligomer (n=1)

A 1 liter three necked round bottomed flask equipped with a mechanical stirrer, thermocouple controller probe, gas inlet and outlet, and Dean-Stark apparatus was charged with N-methyl-2-pyrrolidinone (NMP) solvent, about 320 milliliters, and toluene, about 205 milliliters. The flask was purged with a slow nitrogen stream for about 10 minutes while stirring the mixture. 4-Hydroxybenzocyclobutene, about 14.24 grams (about 118.55 mmole), bis 2,2-(4-hydroxyphenyl)-1,1,1,3,3,3-hexafluoropropane (Bis AF), about 19.93 grams (about 59.26 mmole), and ground anhydrous potassium carbonate, about 34.40 grams (about 249.3 mmole), were added to the mixture and heating begun. Water was azeotropically removed into the Dean-Stark apparatus at about 145° to 150° C. over about 30 minutes. The nitrogen flow was increased and toluene was distilled out at about 165° C. over about 35 minutes. The reaction mixture was then cooled in a water bath to about 65° C. The heating mantle was replaced, a,a,a,2,3,5,6-heptafluorotoluene, about 25.85 grams (about 118.54 mmole), was added in one portion and heating resumed. The reaction mixture was held at about 120° C. for about 1 hour, then at about 140° C. for about 1 and ½ hours, and at about 150° C. for about 1 hour. After cooling to about 65° C. the reaction mixture was neutralized with about 15.0 grams glacial acetic acid, then filtered through a fine glass frit and precipitate washed twice with about 90 milliliter portions of methylene chloride, which was combined with filtrate. About 100 milliliters more of methylene chloride was added and the organic layer extracted with about 1000 milliliters of water divided into 5 portions. The organic layer was dired over anhydrous magnesium sulfate and filtered through a fine glass frit. The filtrate was vacuum stripped at about 130° C. to give a hard resinous product after cooling, about 37.9 grams. The glass transition temperature (Tg) as measured by DSC inflection point was about 68° C.

Preparation of Benzocyclobutene (BCB) Capped Heptafluorotoluene (HFT)/Bis AF Oligomer (n=2)

A 2 liter three necked round bottomed flask equipped with a mechanical stirrer, thermocouple controller probe, gas inlet and outlet, and Dean-Stark apparatus was charged with N-methyl-2-pyrrolidinone (NMP) solvent, about 400 milliliters, and toluene, about 225 milliliters, and purged with a slow nitrogen stream for about 10 minutes while stirring. 4-Hydroxybenzocyclobutene, about 11.51 grams (about 95.77 mmole), bis 2,2-(4-hydroxyphenyl)-1,1,1,3,3,3-hexafluoropropane (Bis AF), about 32.19 grams (about 95.72 mmole), and ground anhydrous potassium carbonate, about 76.6 grams (about 555 mmole), were added and heating commenced. Water was azeotropically removed into the Dean-Stark apparatus at about 145° to 150° C. over about 30 minutes. The nitrogen flow was increased and toluene was distilled out at about 160° over about 35 minutes. The reaction mixture was then cooled in a water bath to about 50° C. The heating mantle was replaced, a,a,a,2,3,5,6-heptafluorotoluene, about 31.31 grams (about 143.59 mmole), was added in one portion and heating resumed. The reaction mixture was held at about 120° C. for about 1 hour, at about 140° C. for about 1 and ½ hours, and finally at about 150° for about 1 hour. After cooling to about 60° C., the reaction mixture was neutralized with about 49.2 grams glacial acetic acid, then filtered through a fine glass frit and precipitate washed with about 400 milliliters of methylene chloride divided into four portions, which was combined with filtrate in separatory funnel. The filtrate was extracted with about 1600 milliliters of water divided into four portions. The organic layer was dried over anhydrous magnesium sulfate and filtered through a fine glass frit. The filtrate was vacuum stripped at about 165° C. to give a hard resinous product after cooling, and 59.5 grams, representing about an 86 percent theoretical yield. The glass transition temperature (Tg) as measured by DSC inflection point was about 73° C.

Preparation of Benzocyclobutene (BCB) Capped Heptafluorotoluene (HFT)/Bis AF Oligomer (n=4)

A 2 liter three necked round bottomed flask equipped with a mechanical stirrer, thermocouple controller probe, gas inlet and outlet, and Dean-Stark apparatus was charged with N,N-dimethylacetamide (DMAc) solvent, about 400 milliliters, and toluene, about 225 milliliters, and purged with a slow nitrogen stream for about 10 minutes while stirring. 4-Hydroxybenzocyclobutene, about 6.01 grams (about 50.01 mmole), bis 2,2-(4-hydroxyphenyl)-1,1,1,3,3,3-hexafluoropropane (Bis AF), about 33,62 grams (about 99.99 mmole), and ground anhydrous potassium carbonate, about 36.52 grams (about 265 mmole), were added and heating commenced. Water was azeotropically removed into the Dean-Stark apparatus at about 135° to 140° C. over about 45 minutes. The nitrogen flow was increased and toluene was distilled out at about 155° C. over about 15 minutes. The reaction mixture was then cooled in a water bath to about 60° C. The heating mantle was replaced, a,a,a,2,3,5,6-heptafluorotoluene, about 27.26 grams (about 124.90 mmole), was added in one portion and heating recommenced. The reaction mixture was held at about 120° C. for about 1 hour and at about 140° C. for about ½ hour. After cooling to about 60° C., the reaction mixture was neutralized with about 16.0 grams glacial acetic acid, then about 400 milliliters water containing about 2 grams concentrated hydrochloric acid was added. The reaction mixture was transferred to a separatory funnel containing about 400 milliliters methylene chloride. The mixture was separated and the organic layer extracted with about 1600 milliliters of water divided into four portions. The organic layer was dried over anhydrous magnesium sulfate, filtered through a fine glass frit, and the filtrate vacuum stripped at about 175° C. over about 25 minutes to give a hard resinous product after cooling, about 57.80 grams, representing about a 77 percent theoretical yield. The glass transition temperature (Tg) as measured by DSC inflection point was about 86° C.

Cure of Benzocyclobutene (BCB) Capped Heptafluorotoluene (HFT)/Bis AF Oligomer Films and Membranes Solutions in toluene were prepared containing about 40 to 70 percent by weight of the various oligomers (n=1, 2 and 4). A casting bar with a 0.015 inch (0.038 centimeter) clearance was used to cast films onto a substrate of 0.005 inch (0.013 centimeter) thick aluminum stock. The cast films were allowed to air dry, then residual solvent was removed by heating at about 70° to 120° in a forced air oven. The samples were transferred to a vacuum over preheated to about 190° C., then cured under full vacuum according to the following schedule; about 1 hour at about 190° C., about 2 hours at about 220° C., and about 1 hour at about 250° C. The aluminum substrate was then dissolved away by floating the sample on 5 to 10 percent by weight hydrochloric acid, then water washing the surface. The glass transition temperatures (Tg) of the cured samples were determined by the inflection point of a Differential Scanning Calorimetry (DSC) plot run at a rate of about 20° C./minute. Thermogravimetric analysis (TGA) was conducted at a scan rate of about 10° C./minute under both air and nitrogen, and the decomposition temperature ($T_d$) at 10 percent weight loss determined. A duPont 1090 Thermal Analyzer was used for both the DSC and TGA determinations. The dielectric constant was measured by a Hewlett Packard 4284 LCR meter using the two fluid technique with the LD3 cell. Data are reported in Table IA.

TABLE IA

| Sample n = | Uncured Tg (°C.) | Cured Tg (°C.) | $T_d$ Air (°C.) | $T_d$ $N_2$ (°C.) | Dielectric Constant[2] |
|---|---|---|---|---|---|
| 0 | 105[1] | 349 | — | 463 | 2.67 |
| 1 | 68 | 213 | 515 | 504 | 2.57 |
| 2 | 73 | 203 | 513 | 507 | 2.57 |
| 4 | 85 | 176 | 517 | 514 | — |

[1]Melting Point
[2]dielectric Constant at 100 kHz

Physical Properties of Cured of Benzocyclobutene (BCB) Capped Heptafluorotoluene (HFT)/Bis AF Oligomer Films Specimens measuring about 0.5 inches (1.27 centimeters) by about 2.5 inches (6.35 centimeters) were prepared from the film samples. The specimens were pulled at about 0.4 inches/minute (1.02 centimeters/minute) on an Instron machine to determine the stress-strain behavior reported in Table IB.

TABLE IB

| Sample n = | Tensile Strength | | Tensile Module | | Elongation at Failure (percent) |
|---|---|---|---|---|---|
| | (psi.) | (kPa) | (kpsi.) | (kPa) | |
| 1 | 9684 | $6.68 \times 10^4$ | 340.0 | $2.35 \times 10^6$ | 4.2 |
| 2 | 6283 | $4.33 \times 10^4$ | 309.8 | $2.14 \times 10^6$ | 2.7 |

Membrane Properties of Cured Benzsocyclobutene (BCB) Capped Heptafluorotoluene (HFT)/Bis AF Oligomers.

The film samples were evaluated for gas separation properties using a constant-volume, variable-pressure gas permeability apparatus. The pure gas permeabilities for helium, methane, ethane, ethylene, oxygen, and nitrogen were measured at about 30° C., and the gas selectivities calculated therefrom. Data are reported in Table IC. Comparative data for a membrane similarly prepared from a high molecular weight polymer formed by the condensation of heptafluorotoluene (HFT) and bisphenol AF, that is, (oxy-2,2-bis(4,4'-phenylene)-1,1,1,3,3,3-hexafluoropropane-oxy-2,6-(trifluoromethyl phenylene), is also illustrated in Table IC. The membranes fabricated from the n=1 and n=2 cross-linked oligomers possess much greater separation factors than that of the membrane prepared from the corresponding polymer.

TABLE IC

| Sample n = | Permeability (Barrers) | | Separation Factor | | | |
|---|---|---|---|---|---|---|
| | He | $O_2$ | $He/CH_4$ | $He/C_2H_4$ | $He/C_2H_6$ | $O_2/N_2$ |
| 1 | 56 | 4.2 | 130 | 185 | 590 | 4.8 |
| 2 | 74 | 5.7 | 155 | 165 | 630 | 5.5 |
| Poly | 190 | 26 | 9 | 9 | 10 | 1.7 |

Sequential Semi-Interpenetrating Network from n=2 Oligomer and Polymer

A solution was prepared by dissolving about 0.75 grams of the n=2 BCB capped HFT/Bis AF oligomer described about and about 0.25 grams of a —(HFT-Bis AF)-polymer in about 1.5 grams of toluene. A casting bar with a 0.015 inch (about 0.038 centimeters) clearance was used to cast films onto a substrate of 0.005 inch (about 0.013 centimeters) thick aluminum stock. The cast films were allowed to air dry then residual solvent removed by heating at about 70° to 120° C. in a forced air oven. The samples were transferred to a vacuum oven preheated to about 190° C. in a forced air oven. The samples were transferred to a vacuum oven preheated to about 190° C., then cured under full vacuum according to the following schedule: about 1 hour at about 190° C., about 2 hours at about 200° C., and about 1 hour at about 250° C. The aluminum substrate was then dissolved away by floating the film on 4 to 10 percent by weight hydrochloric acid, then water washing the surface. The resultant membrane was analyzed for gas permeabilities as described above. Data are reported in Table ID.

TABLE ID

| Sample n = | Permeability (Barrers) | Separation Factor | | |
|---|---|---|---|---|
| | He | $He/CH_4$ | $He/C_2H_4$ | $He/C_2H_6$ |
| 2 Oligomer | 74 | 155 | 165 | 630 |
| Semi-IPN | 83 | 116 | 138 | 474 |
| Polymer | 190 | 9 | 9 | 10 |

The membrane fabricated from the n=2 oligomer possessed a very significantly higher gas separation factor compared to the membrane from the fabricated polymer film. The membrane prepared from the n=2 oligomer also possessed a good gas permeability.

EXAMPLE 2

Amine Capped Heptafluorotoluene (HFT) Based Oligomers

Preparation of Amine Capped Heptafluorotoluene (HFT)/Bis AF Oligomer (n=2.4)

A 500 millimeter three necked round bottomed flask equipped with a mechanical stirrer, thermocouple controller probe, gas inlet and outlet, and Dean-Stark apparatus was charged with N,N-dimethylacetamide (DMAc) solvent, about 200 milliliters, and toluene, about 125 milliliters, and purged with a slow nitrogen stream for about 10 minutes while stirring. Bis 2,2-(4-hydroxyphenyl)-1,1,1,3,3,3-hexafluoropropane (Bis AF), about 10.09 grams (about 30.00 mmole), p-aminophenol, about 3.28 grams (about 30.01 mmoles), and ground anhydrous potassium carbonate, about 13.04 grams (about 94.5 mmole), were added and heating begun. Water was azeotropically removed into the Dean-Stark apparatus at about 145° C. over about 30 minutes. The nitrogen flow was increased and toluene was distilled out at about 150° C. over about 15 minutes. The reaction mixture was then cooled in a water bath to about 45° C. The heating mantle was replaced, and a,a,a,2,3,5,6-heptafluorotoluene added, about 9.81 grams (about 45.00 mmole), was added in one portion and heating recommenced. The reaction mixture was brought to about 120° CF. over about 15 minutes and held at about 120° C. for about 1 hour. After removing the heating mantle, about 100 milliliters toluene was added and the reaction mixture transferred into a separatory funnel containing about 400 milliliters water. The organic layer was separated and extracted with about 800 milliliters of water divided into two portions. The organic layer was dried over anhydrous magnesium sulfate and filtered through a fine glass frit to give a dark amber solution, about 92.60 grams. A small sample was evaporated by heating at about 150° C. for about 20 minutes; calculated non-volatiles were about 20.64 percent and product yield was about 19.11 grams, about 90 percent of theoretical yield. A sample was titrated potentiometrically with perchloric acid in glacial acetic acid and had an amine equivalent weight of 808, which gave a calculated n=2.4.

Preparation of Amine Capped Heptafluorotoluene (HTF)/Bis AF Oligomer (n=2.9)

A 500 milliliter three necked around bottomed flask equipped with a mechanical stirrer, thermocouple controller probe, gas inlet and outlet, and Dean-Stark apparatus was charged with N,N-dimethylacetamide (DMAc) solvent, about 200 milliliters, and toluene, about 125 milliliters, and purged with a slow nitrogen stream for about 10 minutes while stirring. Then bis 2,2-(4-hydroxyphenyl)-1,1,1,3,3,3-hexafluoropropane (BIS AF), about 15.14 grams (about 45.02 mmole), p-aminophenol, about 3.27 grams (about 30.00 mmole), and ground anhydrous potassium carbonate, about 17.41 grams (about 126 mmole,) were added and heating begun. Water was azeotropically removed into the Dean-Stark apparatus at about 135° C. over about 30 minutes. The nitrogen flow was increased and toluene was distilled out at about 150° C,. over about 15 minutes. The reaction mixture was then cooled in a water bath to about 50° C. The heating mantle was replaced, then a,a,a,2,3,5,6-heptafluorotoluene, about 9.82 grams (about 45.03 mmole), was added in one portion and heating recommenced. The reaction mixture was brought to about 120° C. over about 15 minutes and held at about 120° C. for about 1 hour. After removing the heating mantle, about 100 milliliters toluene was added and the reaction mixture transferred into a separatory funnel containing about 400 milliliters water. The organic layer was separated and extracted with about 800 milliliters of water divided into two portions; then the organic layer was dired over anhydrous magnesium sulfate, filtered through a fine glass frit to give a dark amber solution, about 108.56 grams. A small sample was evaporated by heating at about 150° C. for about 20 minutes; calculated non-volatiles were about 22.20 percent and product yield was about 24.10 grams, about 91 percent of theoretical yield. A sample was titrated potentiometrically with perchloric acid in glacial acetic acid and had an amine equivalent weight of 939, which gas a calculated n=2.9. The glass transition temperature (Tg) by DSC inflection point was about 72° C., using a duPont Thermal Analyzer.

Preparation of Amine Capped Heptafluorotoluene (HFT)/Vis AF Oligomer (n=5.2)

A 500 milliliter three necked round bottomed flask equipped with a mechanical stirrer, thermocouple controller probe, gas inlet and outlet, and Dean-Stark apparatus was charged with N,N-dimethylacetamide (DMAc) solvent, about 200 milliliters, and toluene, about 125 milliliters, and purged with a slow nitrogen stream for about 10 minutes while stirring. Then bis 2,2-(4-hydroxyphenyl)-1,1,1,3,3,3-hexafluoropropane (Bis AF), about 13.45 grams (about 40.00 mmole), p-aminophenol, about 2.18 grams (about 20.00 mmole), and ground anhydrous potassium carbonate, about 14.49 grams (about 105 mmole), was added and heating begun. Water was azeotropically removed into the Dean-Stark apparatus at about 135° C. over about 30 minutes. The nitrogen flow was increased and toluene was distilled out at about 155° C. over about 15 minutes. The reaction mixture was then cooled in a water bath to about 50° C. The heating mantle was replaced, then a,a,a,2,3,5,6-heptafluorotoluene, about 10.91 grams (about 50.02 mmole), was added in one portion and heating recommenced. The reaction mixture was brought to about 120° C. over about 15 minutes and held at about 120° C. for about 1 hour. After removing the heating mantle, about 100 milliliters toluene was added and the reaction mixture transferred into a separatory funnel containing about 400 milliliters water. The organic layer was separated and extracted with about 800 milliliters of water divided into two portions, then the organic layer was dried over anhydrous magnesium sulfate and filtered through a fine glass frit to give a dark amber solution, about 102.35 grams. A small sample was evaporated by heating at about 150° C. for about 20 minutes; calculated non-volatiles were about 22.54 percent and product yield was about 23.07 grams, about 94 grams of theoretical yield. A sample was titrated potentiometrically with perchloric acid in glacial acetic acid and had an amine equivalent weight of 1542, which have a calculated value of n=5.2. The glass transition temperature (Tg) by DSC inflection point was about 77° C.

Physical Properties of Cured Amine Capped Heptafluorotoluene (HFT)/Bis AF Oligomers A solution was prepared by dissolving about 8 grams TACTIX 724 epoxy resin (available from the Dow Chemical Company) in about 2 grams acetone. The indicated weight of this solution was mixed with the indicated weight of the oligomer solutions prepared above as shown in Table IIA: the stoichiometry of epoxy groups to active hydrogen was about 1:1.

TABLE IIA

| Sample n = | Oligomer Solution (grams) | Epoxy Resin Solution (grams) |
|---|---|---|
| 2.4 | 3.47 | 0.36 |
| 2.9 | 3.36 | 0.32 |
| 5.2 | 3.67 | 0.22 |

Films were cast using a 0.015 inch (0.038 centimeter) clearance blade onto 0.005 inch (0.013 centimeter) aluminum stock. The solvent was allowed to evaporate for about 42 hours, then the samples were placed in a forced air oven and cured on a schedule of about 2 hours at about 150° C. and about 1 hour at about 180° C. The aluminum substrate was then dissolved away by floating the sample on 5 to 10 percent by weight hydrochloride acid, then water washing the surface. The glass transition temperature (Tg) of the cured sample was determined by the inflection point of a Differential Scanning Calorimetry (DSC) plot run at a rate of about 20° C./minute. Thermogravimetric analysis (TGA) was done at a scan rate of about 10° C./minute under both air and nitrogen, and the decomposition temperature ($T_d$) at 10 percent weight loss determined. A duPont 1090 Thermal Analyzer was used for both determinations. Data are reported in Table IIB.

TABLE IIB

| Sample n = | Uncured Tg (°C.) | Cured Tg (°C.) | $T_d$ Air (°C.) |
|---|---|---|---|
| 2.4 | — | 186 | 306 |
| 2.9 | 72 | 186 | 312 |
| 5.2 | 77 | 150 | 349 |

Specimens of the film samples measuring about 0.5 inches (about 1.27 centimeters) by about 2.5 inches (about 6.35 centimeters) were pulled at about 0.4 inches/minute (1.02 centimeters) on an Instron machine to determine the stress-strain behavior reported in Table IIC.

TABLE IIC

| Sample n = | Strength | | Modulus | | Elongation at Failure (percent) |
|---|---|---|---|---|---|
| | (psi.) | (kPa) | (kpsi.) | (kPa) | |
| 2.4 | 9105 | $6.28 \times 10^5$ | 310.3 | $2.14 \times 10^6$ | 4.6 |
| 2.9 | 10640 | $7.34 \times 10^4$ | 281.1 | $1.94 \times 10^6$ | 6.6 |

Membrane Properties of Cured Amine Capped
Heptafluorotoluene (HFT)/Bis AF Oligomers Gas permeability data was measured on pure gases at about 30° C. using a constant-volume, variable pressure apparatus. Data are reported in Table IID for helium, methane, ethane, and ethylene.

TABLE IID

| Sample $n =$ | Permeability (Barrers) | Separation Factor | | |
|---|---|---|---|---|
| | | He/CH$_4$ | He/C$_2$H$_4$ | He/C$_2$H$_6$ |
| 2.9 | 16 | 99 | 108 | 431 |

EXAMPLE 3

Unsaturated Capped Heptafluorotoluene (HFT) Based Oligomers

Synthesis of Phenyl Methacrylate Capped Heptafluorotoluene (HFT)/Bis AF Oligomer (n=2)

A 500 milliliter three necked round bottomed flask equipped with a mechanical stirrer, thermocouple controller probe, gas inlet and outlet, and Dean-Stark apparatus was charged with N,N-dimethylacetamide (DMAc) solvent, about 200 milliliters, and toluene, about 125 milliliters, and purged with a slow nitrogen stream for about 10 minutes while stirring. Then bis 2,2-(4-hydroxyphenyl)-1,1,1,3,3,3-hexafluoropropane (Bis AF), about 15.24 grams (about 45.32 mmole), and ground anhydrous potassium carbonate, about 13.50 grams (about 97.8 mmole), were added and heating begun. Water was azeotropically removed into the Dean-Stark apparatus at about 135° C. over about 30 minutes. The nitrogen flow was increased and toluene was distilled out at about 155° C. over about 20 minutes. The reaction mixture was then cooled in a water bath to about 50° C. The heating mantle was replaced, then a,a,a,2,3,5,6-heptafluorotoluene, about 6.59 grams (about 30.22 mmole), was added in one portion and heating recommenced. The reaction mixture was brought to about 90° C. over about 10 minutes and held at about 90° C. for about ½ hour. The reaction mixture was cooled to about 21° C. in an ice bath, then methacryloyl chloride, 90 percent technical grade, about 4.62 grams (1.25 eq.), was added in one portion. The ice bath was removed and the mixture held at about 25° C. for about one hour. Toluene, about 100 milliliters, was added and the reaction mixture transferred into a separatory funnel containing about 400 milliliters water. The organic layer was separated and extracted with about 800 milliliters of water divided into two portions, followed by about 400 milliliters water containing about 0.5 grams concentrated hydrochloric acid. The organic layer was dried over anhydrous magnesium sulfate, filtered through a fine glass frit to give an amber solution, about 119.38 grams. A small sample was evaporated by heating at about 150° C. for about 20 minutes; calculated non-volatiles were about 17.80 percent and product yield was about 21.25 grams, about 94 percent of theoretical yield, The glass transition temperature (Tg) of the product as measured by inflection point DSC was about 55° C.

Synthesis of Benzyl Methacrylate Capped Heptafluorotoluene (HFT)/Bis AF Oligomer (n=2)

A 500 milliliter three necked round bottomed flask equipped with a mechanical stirrer, thermocouple controller probe, gas inlet and outlet, and Dean-Stark apparatus was charged with N,N-dimethylacetamide (DMAc) solvent, about 150 milliliters, and toluene, about 100 milliliters, and purged with a slow nitrogen stream for hydroxyphenyl)-1,1,1,3,3,3-hexafluoropropane (Bis AF), about 7.48 grams (about 22.24 mmole), and ground anhydrous potassium carbonate, about 9.53 grams (about 70.0 mmole), were added and heating begun. Water was azeotropically removed into the Dean-Stark apparatus at about 135° C. over about 30 minutes. The nitrogen flow was increased and toluene was distilled out at about 145° C. The reaction mixture was then cooled in a water then a,a,a,2,3,5,6-heptafluorotoluene, about 7.28 grams (about 33.37 mmole) was added, in one portion and heating recommenced. The reaction mixture was brought to about 120° C. and held at about 120° C. for about 1 hour. The reaction mixture was cooled to about 20° C. in an ice bath, then methacryloyl chloride, 90 percent technical grade, about 2.85 grams, (about 24.54 mmole, 1.1 eq.), was added in one portion. The ice bath was removed and the mixture held at about 25° C. for about ¾ hour, then temperature increased to about 50° C. and held about 15 minutes. Toluene, about 100 milliliters, was added and the reaction mixture transferred into a separatory funnel containing about 500 milliliters brine. The organic layer was separated and washed twice with about 400 milliliter portions brine, then dried over anhydrous magnesium sulfate, and vacuum filtered through a fine glass frit to give an amber solution, about 93.90 grams. A small sample was evaporated by heating at about 150° C. for about 20 minutes; calculated non-volatiles were about 14.83 percent and product yield calculated was about 13.93 grams, about 79 percent of theoretical. The glass transition temperature (Tg) of the product as measured by inflection point DSC was about 55° C.

Synthesis of Benzyl Methacrylate Capped Heptafluorotoluene (HFT)/Bis AF Oligomer (n=9)

A 500 milliliter three necked round bottomed flask equipped with a mechanical stirrer, thermocouple controller probe, gas inlet and outlet, and Dean-Stark apparatus was charged with N,N-dimethylacetamide (DMAc) solvent, about 100 milliliters, and toluene, about 75 milliliters, and purged with a slow nitrogen stream for about 10 minutes while stirring. Then bis 2,2-(4-hydroxyphenyl)-1,1,1,3,3,3-hexafluoropropane (Bis AF), about 6.05 grams (about 18.00 mmole), 4-hydroxybenzyl alcohol, about 0.50 grams (about 4.01 mmole), and ground anhydrous potassium carbonate, about 5.80 grams (about 42.0 mmole), were added and heating begun. Water was azeotropically removed into the Dean-Stark apparatus at about 140° C. over about 30 minutes. The nitrogen flow was increased and toluene was distilled out at about 155° C. The reaction mixture was then cooled in a water bath to about 50° C. The heating mantle was replaced, then a,a,a,2,3,5,6 heptafluorotoluene, about 4.36 grams (about 20.00 mmole), was added in one portion and heating recommenced. The reaction mixture was brought to about 120° C. and held at about 120° C. for about 1 hour. The reaction mixture was cooled to about 25° C. in an ice bath, then methacryloyl chloride, 90 percent technical grade, about 0.515 grams, (1.06 eq.), was added in one portion. The ice bath was removed and the mixture held at about 25° C. for about one hour, then temperature was increased to about 70° C. and held for about 15 minutes. Toluene, about 50 milliliters, was added and the reaction mixture transferred into a separatory funnel containing about 200 milliliters saturated brine. The organic layer was separated and washed with about 200 milliliters brine, then vacuum filtered through a fine glass frit and the filtrate concentrated under vacuum at about 60° C. to give an amber solution, about 22.87 grams. A small sample was evaporated by heating at about 150° C. for about 20 minutes; calculated non-volatiles were about 42.60 percent and product yield calculated was about 9.74 grams, about 94 percent of theoretical yield. The glass transition temperature (Tg) was about 130° C. as measured by DSC inflection point.

Synthesis of Vinyl Benzyl Capped Heptafluorotoluene (HFT)/Bis AF Oligomer (n=2)

A 500 liter three necked round bottomed flask equipped with a mechanical stirrer, thermocouple controller probe, gas inlet and outlet, and Dean-Stark apparatus was charged with N,N-dimethylacetamide (DMAc) solvent, about 200 milliliters, and toluene, about 125 milliliters, and purged with a slow nitrogen stream for about 10 minutes while stirring. Then bis 2,2-(4-hydroxyphenyl)-1,1,1,3,3,3-hexafluoropropane (Bis AF), about 20.18 grams (about 60.00 mmole), and ground anhydrous potassium carbonate, about 17.12 grams (about 1261 mmole), were added and heating begun. Water was azeotropically removed into the Dean-Stark trap at about 135° C. over about 30 minutes. The nitrogen flow was increased ad toluene was distilled out at about 150° C. The reaction mixture was then cooled in a water bath to about 45° C. The heating mantle was replaced, then a,a,a,2,3,5,6 heptafluorotoluene, about 8.73 grams (about b 40.01 mmole), was added in one portion and heating resumed. The reaction mixture was brought to about 90° C. over about 15 minutes and held at about 90° C. for about ½ hour. 3-Vinyl benzyl chloride (30 percent, 4-isomer), about 6.23 grams (about 40.82 mmole), was added in one portion and the reaction temperature maintained at about 90° C. for about ½ hour more. Toluene, about 125 milliliters, was added and the reaction mixture transferred into a separatory funnel containing about 400 milliliters water. The organic layer was separated, washed twice with about 400 milliliter portions water, then dried over anhydrous magnesium sulfate and vacuum filtered through a fine glass frit to give an amber solution, about 101.87 grams. A small sample was evaporated by heating at about 150° C. for about 20 minutes; calculated non-volatiles were about 24.86 percent and product yield calculated was about 25.32 grams, about 79 percent of theoretical yield. The glass transition temperature (Tg) of the product as measured by inflection point DSC was about 63° C.

Cross-Linking of Unsaturated Capped Oligomers

Initiated oligomer mixtures were prepared by taking aliquots of the above toluene solutions of the unsaturated capped oligomers and adding azobis(isobutyronitrile) (AIBN) to give about 0.5 weight percent AIBN based on weight of oligomer present. Films were cast from the solutions, allowed to air dry, and residual solvent removed by heating at about 70° C. for about 5 to 20 minutes. Film samples were cross-linked by heating under vacuum at about 95° to 110° C. for about 60 to 75 minutes. Resultant films were insoluble in toluene and methylene chloride.

EXAMPLE 4

Methylol Capped Heptafluorotoluene (HFT) Based Oligomers

Synthesis of Phenyl Methylol Capped Heptafluorotoluene (HFT)/Bis AF Oligomer (n=2)

A 500 liter three necked round bottomed flask equipped with a mechanical stirrer, thermocouple controller probe, gas inlet and outlet, and Dean-Stark apparatus was charged with N,N-dimethylacetamide (DMAc) solvent, about 150 milliliters, and toluene, about 100 milliliters, and purged with a slow nitrogen stream for about 10 minutes while stirring. Then bis 2,2-(4-hydroxyphenyl)-1,1,1,3,3,3-hexafluoropropane (Bis AF), about 6.72 grams (about 20.00 mmole), 4-hydroxybenzyl alcohol, about 2.48 grams (about 20.00 mmole), and ground anhydrous potassium carbonate, about 9.53 grams (about 69.1 mmole), were added and heating begun. Water was azeotropically removed into the Dean-Stark apparatus at about 135° C. over about 30 minutes. The nitrogen flow was increased and toluene was distilled out at about 155° C. The reactor mixture was then cooled in a water bath to about 50° C. The heating mantle was replaced, then a,a,a,2,3,5,6 heptafluorotoluene, about 6.55 grams (about 30.02 mmole), was added in one portion and heating resume. The reaction mixture was brought to about 120° C. and held at about 120° C. for about 1 hour. Toluene, about 100 milliliters, was added and the reaction mixture transferred into a separatory funnel containing about 400 milliliters brine. The organic layer was separated, then vacuum filtered through a fine glass frit and the filtrate concentrated under vacuum at about 60° C. to give an amber solution, about 35.60 grams. A small sample was evaporated by heating at about 150° C. for about 20 minutes; calculated non-volatiles were about 39.60 percent and product yield calculated was about 14.10 grams, about 97 percent of theoretical yield.

Cross-Linking of Phenyl Methylol Capped Heptafluorotoluene (HFT)/Bisphenol AF Oligomer (n=2)

Test solutions were prepared by taking about 0.63 grams aliquots of the above product solution (0.25 grams methylol capped oligomer content) and adding variously about 0.0025 grams (1 percent p-TSA), about 0.005 grams (2 percent p-TSA), and about 0.01 grams (4 percent p-TSA) of p-toluenesulfonic acid (p-TSA) dissolved in a few drops of methanol. A few drops of each test solution were placed in aluminum pans, air dried, then cured in an oven under the time/temperature combinations listed in Table IV. The cured samples were then tested for solubility in toluene. Results are reported in Table IV.

TABLE IV

| Sample (percent p-TSA) | Time (minutes) | Temperature (°C.) | Soluble in Toluene |
| --- | --- | --- | --- |
| 1 | 15 | 125 | Yes |
| 1 | 30 | 125 | Yes |
| 1 | 60 | 125 | Yes |
| 1 | 15 | 150 | Yes |
| 1 | 30 | 150 | No |
| 2 | 15 | 125 | Yes |
| 2 | 30 | 125 | Yes |
| 2 | 60 | 125 | Yes |
| 2 | 15 | 150 | Yes |
| 2 | 30 | 150 | No |

TABLE IV-continued

| Sample (percent p-TSA) | Time (minutes) | Temperature (°C.) | Soluble in Toluene |
|---|---|---|---|
| 4 | 15 | 125 | Yes |
| 4 | 30 | 125 | Yes |
| 4 | 60 | 125 | No |
| 4 | 15 | 150 | No |
| 4 | 30 | 150 | No |

EXAMPLE 5

Benzocyclobutene (BCB) Capped Pyridine Based Oligomers

Preparation of Benzocyclobutene (BCB) Capped Pyridinyl/Bis AF Oligomer (n=2)

Sample 5A

A 250 liter three necked round bottomed flask equipped with a mechanical stirrer, thermocouple controller probe, gas inlet and outlet, and Dean-Stark apparatus was charged with N,N-dimethylacetamide (DMAc) solvent, about 100 milliliters, and toluene, about 75 milliliters, and purged with a slow nitrogen stream for about 10 minutes while stirring. Then bis 2,2-(4-hydroxyphenyl)-1,1,1,3,3,3-hexafluoropropane (Bis AF), about 3.36 grams (about 10.00 mmole), 4-hydroxybenzocyclobutene, about 1.20 grams (10.02 mmole), and ground anhydrous potassium carbonate, about 4.28 grams (about 31.5 mmole), were added and heating begun. Water was azeotropically removed into the Dean-Stark apparatus at about 135° C. over about 30 minutes. The nitrogen flow was increased and toluene was distilled out at about 155° C. The reaction mixture was then cooled in a water bath to about 50° C. The heating mantle was replaced, then 2,6-difluoropyridine, about 1.73 grams (about 15.01 mmole), was added in one portion and heating recommenced. The reaction mixture was brought to about 120° C. and held for about ¾ hour, then increased to about 140° C. and held about 1 and ½ hours, and finally increased to about 150° C. and held for about 1 hour. The reaction mixture was cooled to about 100° C., diluted with toluene, about 50 milliliters, and then transferred into a separatory funnel containing about 200 milliliters water. The organic layer was separated and washed twice with about 200 milliliter portions water, then dried over anhydrous magnesium sulfate, and vacuum filtered through a fine glass frit. Filtrate was concentrated under vacuum at about 60° C. to give an amber solution, about 7.95 grams. A small sample was evaporated by heating at about 150° C. for about 20 minutes; calculated non-volatiles were about 64.85 percent and product yield calculated was about 5.156 grams, about 91 percent of theoretical yield. The glass transition temperature (Tg) was about 44° C. as measured by DSC inflection point.

Preparation of Benzocyclobutene (BCB) Capped 4-Trifluoromethylpyridinyl/Bis AF Oligomer (n=2)

Sample 5B

A 250 milliliter three necked round bottomed flask equipped with a mechanical stirrer, thermocouple controller probe, gas inlet and outlet, and Dean-Stark apparatus was charged with N,N-dimethylacetamide (DMAc) solvent, about 100 milliliters, and toluene, about 75 milliliters, and purged with a slow nitrogen stream for about 10 minutes while stirring. Then bis 2,2-(4-hydroxyphenyl)-1,1,1,3,3,3-hexafluoropropane (Bis AF), about 3.36 grams (about 10.00 mmole), 4-hydroxybenzocyclobutene, (about 1.20 grams (about 10.02 mmole), and ground anhydrous potassium carbonate, and 4.28 grams (about 31.5 mmole), were added and heating begun. Water was azeotropically removed into the Dean-Stark apparatus at about 135° C. over about 30 minutes. The nitrogen flow was increased and toluene was distilled out at about 155° c. The reaction mixture was then cooled in a water bath to about 55° C. The heating mantle was replaced, then 2,6-dichloro-4-trifluoromethylpyridine, about 3.24 grams (about 15.01 mmole), was added in one portion and heating resumed. The reaction mixture was brought to about 120° C. and held for about ¾ hour, then increased to about 140° C. and held about 1 and ½ hours, and finally increased to about 150° C. and held for about 1 hour. The reaction mixture was cooled to about 100° C., diluted with toluene, about 50 milliliters, and then transferred into a separatory funnel containing about 200 milliliters water. The organic layer was separated and washed twice with about 200 milliliter portions water, then dried over anhydrous magnesium sulfate, and vacuum filtered through a fine glass frit. Filtrate was concentrated under vacuum at about 60° C. to give an amber solution, about 11.56 grams. A small sample was evaporated by heating at about 150° C. for about 20 minutes; calculated non-volatiles were about 53.16 percent and product yield calculated was about 6.14 grams, about 92 percent of theoretical yield. The glass transition temperature (Tg) was about 43° C. as measured by DSC inflection point.

Preparation of Benzocyclobutene (BCB) Capped 4-Cyanopyridinyl/Bis AF Oligomer (n=2)

Sample 5C

A 250 milliliter three necked round bottomed flask equipped with a mechanical stirrer, thermocouple controller probe, gas inlet and outlet, and Dean-Stark apparatus was charged with N,N-dimethylacetamide (DMAc) solvent, about 100 milliliters, and toluene, about 75 milliliters, and purged with a slow nitrogen stream for about 10 minutes while stirring. Then bis 2,2-(4-hydroxyphenyl)-1,1,1,3,3,3-hexafluoropropane (Bis AF), about 3.36 grams (about 10.01 mmole), 4-hydroxybenzocyclobutene, about 1.20 grams (about 10.01 mmole), and ground anhydrous potassium carbonate, about 4.28 grams (about 31.5 mmole), were added and heating begun. Water was azeotropically removed into the Dean-Stark apparatus at about 135° C,. over about 30 minutes. The nitrogen flow was increased and toluene was distilled out at about 155° C. The reaction mixture was then cooled in a water bath to about 40° C. The heating mantle was replaced, then 2,6-dichloro-4-cyanopyridine, about 2.60 grams (about 15.00 mmole), was added in one portion and heating recommenced. The reaction mixture was brought to about 120° C. and held for about ¾ hour, then increased to about 140° C. and held about 1 and ½ hours, and finally increased to about 150° C. and held for about 1 hour. The reaction mixture was cooled to about 100° C., diluted with toluene, about 50 milliliters, and then transferred into a separatory funnel containing about 200 milliliters water. The organic layer was separated and washed with about 200 milliliters water, then dried over anhydrous magnesium sulfate and vacuum filtered through a fine glass frit. The filtrate was concentrated under vacuum at about 60° C. to give an amber solution, about 11.04 grams. A small sample was evaporated by heating at about 150° C. for about 20 percent and product yield calculated was about 5.35 grams, about 79 percent of theoretical yield. Glass transition temperature (Tg) was about 57° C. as measured by DSC inflection point.

Preparation of Benzocyclobutene BCB Capped 3,5-Dichloropyridinyl/Bis AF Oligomer (n=2)

Sample 5D

A 250 milliliter three necked round bottomed flask equipped with a mechanical stirrer, thermocouple controller probe, gas inlet and outlet, and Dean-Stark apparatus was charged with N,N-dimethylacetamide (DMAc) solvent, about 100 milliliters, and toluene, about 75 milliliters, and purged with a slow nitrogen stream for about 10 minutes while stirring. Then bis 2,2-(4-hydroxyphenyl)-1,1,1,3,3,3-hexafluoropropane (Bis AF) about 3.36 grams (about 10.00 mmole), 4-hydroxybenzocyclobutene, about 1.20 grams (about 10.01 mmole), and ground anhydrous potassium carbonate, about 4.28 grams (about 31.5 mmole), was added and heating begun. Water was azeotropically removed into the Dean-Stark apparatus at about 135° C. over about 30 minutes. The nitrogen flow was increased and toluene was distilled out at about 155° C. The reaction mixture was then cooled in a water bath to about 50° C. The heating mantle was replaced, then 2,6-difluoro-3,5-dichloropyridine, about 2.76 gram, (about 15.00 mmole), was added in one portion and heating recommenced. The reaction mixture was brought to about 120° C. and held for about ¾ hour, the increased to about 140° C. and held about 1 and ½ hours, and finally increased to about 150° C. and held for about 1 and ¼ hours. The reaction mixture was cooled to about 100° C., diluted with toluene, about 50 milliliters, and then transferred into a separatory funnel containing about 200 milliliters water. The organic layer was separated and washed with about 200 milliliters water, then dried over anhydrous magnesium sulfate and vacuum filtered through a fine glass frit. The filtrate was concentrated under vacuum at about 60° C. to give an amber solution, about 11.76 grams. A small sample was evaporated by heating at about 150° C. for about 20 minutes; calculated non-volatiles were about 49.6 percent and product yield calculated was about 5.83 grams, about 87 percent of theoretical yield. The glass transition temperature (Tg) was about 75° C. as measured by DSC inflection point.

Preparation of Benzocyclobutene (BCB) Capped 3-Chloro-5-trifluoromethylpyridinyl/Bis AF Oligomer (n=2)

Sample 5E

A 250 milliliter three necked round bottomed flask equipped with a mechanical stirrer, thermocouple controller probe, gas inlet and outlet, and Dean-Stark apparatus was charged with N,N-dimethylacetamide (DMAc) solvent, about 100 milliliters, and toluene, about 75 milliliters, and purged with a slow nitrogen stream for about 10 minutes while stirring. Then bis 2,2-(4-hydroxyphenyl)-1,1,1,3,3,3-hexafluoropropane (Bis AF), about 3.36 grams (about 10.00 mmole), 4-hydroxybenzocyclobutene, about 1.21 grams (about 10.00 mmole), and ground anhydrous potassium carbonate, about 4.28 grams (about 31.5 mmole), were added and heating begun. Water was azeotropically removed into the Dean-Stark apparatus at about 135° C. over about 30 minutes. The nitrogen flow was increased and toluene was distilled out at about 155° C. The reaction mixture was then cooled in a water bath to about 50° C. The heating mantle was replaced, then 2,6-difluoro-3-chloro-5-trifluoromethylpyridine, about 3.26 grams (about 15.00 mmole), was added in one portion and heating recommenced. The reaction mixture was brought to about 120° C. and held for about ¾ hour, then increased to about 140° C. and held about 1 and ½ hours, and finally increased to about 150° C. and held for about 1 hour. The reaction mixture was cooled to about 100° C., diluted with toluene, about 50 milliliters, and then transferred into a separatory funnel containing about 200 milliliters water. The organic layer was separated and washed with about 200 milliliters water, then dried over anhydrous magnesium sulfate and vacuum filtered through a fine glass frit. The filtrate was concentrated under vacuum at about 60° C. to give an amber solution, about 11.24 grams. A small sample was evaporated by heating at about 150° C. for about 20 minutes; calculated non-volatiles were about 44.6 percent and product yield calculated was about 5.01 grams, and 70 percent of theoretical yield. The glass transition temperature (Tg) was about 53° C., as measured by DSC inflection point.

Preparation of Benzocyclobutene (BCB) Capped Pyridinyl/Bis A Oligomer (n=2)

Sample 5F

A 250 milliliter three necked round bottomed flask equipped with a mechanical stirrer, thermocouple controller probe, gas inlet and outlet, and Dean-Stark apparatus was charged with N,N-dimethylacetamide (DMAc) solvent, about 100 millimeters, and toluene, about 75 milliliters, and purged with a slow nitrogen stream for about 10 minutes while stirring. Then bis 2,2-(4-hydroxyphenyl)-propane (Bis A), about 2.28 grams (about 10.00 mmole), 4-hydroxybenzocyclobutene, about 1.20 grams (about 10.01 mmole), and ground anhydrous potassium carbonate, about 4.28 grams (about 31.5 mmole), was added and heating begun. Water was azeotropically removed into the Dean-Stark apparatus at about 135° C. over about 30 minutes. The nitrogen flow was increased and toluene was distilled out at about 155° C. The reaction mixture was then cooled in a water bath to about 50° C. The heating mantle was replaced, then 2,6-difluoropyridine, about 1.73 grams (about 15.01 mmole), was added in one portion and heating recommenced. The reaction mixture was brought to about 120° C. and held for about ½ hour, then increased to about 140° C. and held about 1 hour, and finally increased to about 150° C. and held for about 1 hour. The reaction mixture was cooled to about 100° C., diluted with toluene, about 100 milliliters, and then transferred into a separatory funnel containing about 200 milliliters water. The organic layer was separated and washed with about 200 milliliters water, then dried over anhydrous magnesium sulfate and vacuum filtered through a fine glass frit. The filtrate was concentrated under vacuum at about 60° C. to give an amber solution, about 8.16 grams. A small sample was evaporated by heating at about 150° C. for about 20 minutes; calculated non-volatiles were about 41.26 percent and product yield calculated was about 3,367 grams, about 73 percent of theoretical yield. The glass transition temperature (Tg) was about 36° C., as measured by DSC inflection point.

Cure of Benzocyclobutene (BCBN) Capped Pyridinyl/Bis AF Oligomer Films and Membranes Solutions in toluene were prepared containing about 40 to 70 percent by weight of the various oligomers. A casting bar with a 0.015 inch (0.038 centimeter) clearance was used to cast films onto a substrate of 0.005 inch (0.013 centimeter) thick aluminum stock. The cast films were allowed to air dry, then residual solvent removed by heating at about 70° to 120° C. in a forced air oven. Samples were transferred to a vacuum oven preheated to about 190° C., then cured under full vacuum according to the following schedule: about 1 hour at 190° C., about 2 hours at about 220° C., and about 1 hour at about 250° C. The aluminum substrate was then dissolved away by floating the sample on about 5 to 10 percent by weight hydrochloric acid, then water washing the surface. The glass transition temperature (Tg) of the cured sample was determined by the inflection point of a Differential Scanning Calorimetry (DSC) plot run at a rate of about 20° C./minute. Thermogravimetric analysis (TGA) was done at a scan rate of about 10° C./minute under both air and nitrogen to determine the decomposition temperature ($T_d$) at 10 percent weight loss. Data are reported in Table VA. A duPont 1090 Thermal Analyzer was used for both determinations.

TABLE VA

| Sample | Uncured Tg (°C.) | Cured Tg (°C.) | $T_d$ Air (°C.) | $T_d$ $N_2$ (°C.) |
|---|---|---|---|---|
| 5A | 44 | 136 | 369 | 369 |
| 5B | 43 | 141 | 397 | 401 |
| 5C | 57 | 146 | 371 | 389 |
| 5D | 75 | 125 | 387 | 388 |
| 5E | 53 | 110 | 358 | 358 |
| 5F | 36 | 99 | 405 | 421 |

Specimens of the BCB capped 4-cyano pyridinyl/Bis AF n=2 Oligomer (Sample 5C) film samples measuring about 0.5 inches (about 1.27 centimeters) by about 2.5 inches (about 6.35 centimeters) were pulled at about 0.4 inches/minute (1.02 centimeters) on an Instron machine to determine the stress-strain behavior reported in Table VB.

| Sample n = | Tensile Strength (psi.) | Tensile Strength (kPa) | Tensile Modulus (kpsi.) | Tensile Modulus (kPa) | Elongation at Failure (percent) |
|---|---|---|---|---|---|
| 2 | 9692 | $6.6 \times 10^4$ | 390.6 | $2.69 \times 10^6$ | 3.5 |

Gas permeability data was measured on film samples of the BCB capped pyridinyl/Bis AF n=2 oligomer using (Sample 5A) pure gases at about 30° C. using a constant-volume, variable pressure apparatus, and the gas selectivities calculated therefrom. Data are reported in Table VC for helium, methane, ethane, oxygen, nitrogen, and ethylene.

TABLE VC

| Sample n = | Permeability (Barrers) He | $O_2$ | $N_2$ | Selectivity He/$CH_4$ | He/$C_2H_4$ | He/$C_2H_6$ | $O_2/N_2$ |
|---|---|---|---|---|---|---|---|
| 2 | 20 | 0.9 | 0.13 | 213 | 702 | >1000 | 6.8 |

What is claimed is:

1. A process of separating gases comprising:

A. contacting one side of a semi-permeable gas separation membrane with a feed gas mixture under pressure, wherein said membrane divides a separation chamber into a high pressure side into which the feed gas mixture is fed and a low pressure side;

B. maintaining a pressure differential across said membrane under conditions such that at least one gaseous component in the feed gas mixture selectively permeates through said membranes from the high pressure side to the low pressure side of said membrane;

C. removing from the low pressure side of said membrane permeated gas which is enriched in at least one selectively permeating gaseous component; and D. removing from the high pressure side of said membrane non-permeated gas which is depleted in at least one selectively permeating gaseous component;

wherein said membrane comprises a thin, cross-linked discriminating layer derived from an oligomer containing reactive end groups, and wherein said oligomer possesses a degree of polymerization of less than about 15 or a number-average molecular weight of less than about 6,000.

2. The process of claim 1 wherein said oligomer is selected from the group consisting of unsubstituted or substituted oligo-carbonates, oligo-estercarbonates, oligo-esters, oligo-arylates, oligo-arylethers, oligo-amides, oligo-amideimides, oligo-arylsulfones, oligo-etherketones, oligo-ethersulfones, oligo-etherimides, oligo-thioethers, oligo-pyridinylarylethers, oligo-benzoxazoles, oligo-oxadiazoles, oligo-anilines, oligo-pyrolle, oligo-triazole, oligo-cyanoaryl ethers, and physical co-oligomers and physical mixtures thereof.

3. The process of claim 2 wherein said end groups are selected from the group consisting of hydroxy, methacrylate, acrylate, styryl, vinyl benzyl, cinnamate, vinyl, allyl, isopropenyl, benzocyclobutene, benzocyclobutanone, benzocyclobutene dione, epoxy, cyanate, maleimide, amine, ethynyl, trifluorovinyl, amino, methylol, and benzophenone.

4. The process of claim 3 wherein said membrane is a composite membrane having a support layer comprising a microporous membrane characterized by a porosity of between about 10 percent and about 90 percent and average pore size of up to about 0.5 microns.

5. The process of claim 4 wherein said microporous membrane comprises a copolymer selected from the group consisting of unsubstituted or substitutecd polysulfones, polyethersulfones, polyetherketones, polyethers, polyesters, polycarbonates, polyestercarbonates, polyarylates, polyamides, polyimides, polybenzoxazoles, cellulosics, cellulose esters, and polyfluoroolefins.

6. The process of claim 3 wherein said membrane is a hollow fiber.

7. The process of claim 3 wherein the gas selectivity of oxygen/nitrogen at about 30° C. is at least about 3.0.

8. The membrane of claim 7 wherein the gas permeability for oxygen is at least about 0.5 Barrer.

9. The membrane of claim 3 wherein the gas selectivity of helium/methane at about 30° C. is at least about 50.

10. The membrane of claim 9 wherein the gas permeability for helium at about 30° C. is at least about 5 Barrers.

11. The membrane of claim 3 wherein the gas selectivity of helium/ethane at about 30° C. is at least about 80.

12. The membrane of claim 3 wherein the gas selectivity of helium/ethylene at about 30°C. is at least about 75.

13. The process of claim 3 wherein the feed gas mixture comprises at least one of the gases selected from the group consisting of hydrogen, helium, oxygen, nitrogen, carbon monoxide, carbon dioxide, water vapor, hydrogen sulfide, ammonia, and light hydrocarbons.

14. The process of claim 13 wherein the pressure of the feed gas mixture is between about 5 psig and about 2000 psig.

15. The process of claim 14 wherein the temperature of the feed gas mixture is between about 0° C. and about 150° C.

16. The process of claim 15 wherein the temperature of the membrane is between about 0° C. and about 150° C.

17. A semi-permeable gas separation membrane comprising a thin, cross-linked discriminating layer derived from an oligomer containing reactive end groups, wherein said oligomer possesses a degree of polymerization of less than about 15 or a number-average molecular weight of less than about 6,000.

18. The membrane of claim 17 wherein said oligomer is selected from the group consisting of unsubstituted or substituted oligo-carbonates, oligo-estercarbonates, oligo-esters, oligo-arylates, oligo-arylethers, oligo-amides, oligo-amideimides, oligo-arylsulfones, oligo-etherketones, oligo-ethersulfones, oligo-etherimides, oligo-thioethers, oligo-pyridinylarylethers, oligo-benzoxazoles, oligo-oxadiazoles, oligo-anilines, oligo-pyrolle, oligo-triazole, oligo-cyanoaryl ethers, and co-oligomers and physical mixtures thereof.

19. The membrane of claim 18 wherein said end groups are selected from the group consisting of hydroxy, methacrylate, acrylate, styryl, cinnamate, vinyl benzyl, vinyl allyl, isopropenyl, benzocyclobutene, benzocyclobutanone, benzocyclobutene dione, epoxy, cyanate, maleimide, amine, ethynyl, trifluorovinyl, amino, methylol, and benzophenone.

20. The membrane of claim 19 wherein said membrane is a composite membrane having a support layer comprising a microporous membrane characterized by a porosity of between about 10 percent and about 90 percent and an average pore size of up to about 0.5 microns.

21. The membrane of claim 20 wherein said microporous membrane comprises a polymer selected from the group consisting of unsubstituted or substituted polysulfones, polyethersulfones, polyetherketones, polyethers, polyesters, polycarbonates, polyestercarbonates, polyarylates, polyamides, polyimides, polybenzoxazoles, cellulosics, cellulose esters, and polyfluoroolefins.

22. The membrane of claim 19 wherein said membrane is a hollow fiber.

23. The membrane of claim 19 wherein the gas selectivity of oxygen/nitrogen at about 30° is at least about 3.0.

24. The membrane of claim 23 wherein the gas permeability for oxygen is at least about 0.5 Barrer.

25. The membrane of claim 23 wherein the gas selectivity of oxygen/nitrogen at about 30° C. is at least about 4.0.

26. The membrane of claim 25 wherein the gas permeability for oxygen is at least about 2.5 Barrer.

27. The membrane of claim 19 wherein the gas selectivity of helium/methane at about 30° . is at least about 50.

28. The membrane of claim 27 wherein the gas permeability for helium is at least about 5.0 Barrer.

29. The membrane of claim 27 wherein the gas selectivity of helium/methane at about 30° C. is at least about 95.

30. The membrane of claim 29 wherein the gas permeability for helium is at least about 15 Barrer.

31. The membrane of claim 19 wherein the gas selectivity of helium/ethane at about 30° C. is at least about 80.

32. The membrane of claim 31 wherein the gas selectivity of helium/ethane at about 30° C. is at least about 150.

33. The membrane of claim 19 wherein the gas selectivity of helium/ethylene at about 30° C. is at least about 75.

34. The membrane of claim 33 wherein the gas selectivity of helium/ethylene at about 30° C. is at least about 125.

* * * * *

UNITED STATES PATENT AND TRADEMARK OFFICE
CERTIFICATE OF CORRECTION

PATENT NO. : 5,156,656

DATED : October 20, 1992

INVENTOR(S) : Theodore Parker et al.

It is certified that error appears in the above-identified patent and that said Letters Patent is hereby corrected as shown below:

Column 24, line 29, after "oligo-amides, " insert -- oligo-imides, --;

Column 24, line 49, delete "copolymer" and insert -- polymer --;

Column 25, line 31, after "oligo-amides, " insert -- oligo-imides, --;

Column 25, line 40, delete "vinyl allyl" and insert -- vinyl, allyl, --;

UNITED STATES PATENT AND TRADEMARK OFFICE
CERTIFICATE OF CORRECTION

PATENT NO. : 5,156,656

DATED : October 20, 1992

INVENTOR(S) : Theodore Parker et al

It is certified that error appears in the above-identified patent and that said Letters Patent is hereby corrected as shown below:

Column 26, line 14, delete "30°" and insert --30°C --.
Column 26, line 24, delete "30°" and insert --30°C --.

Signed and Sealed this

Sixteenth Day of November, 1993

BRUCE LEHMAN

Commissioner of Patents and Trademarks